United States Patent
Lee et al.

(10) Patent No.: US 9,156,017 B2
(45) Date of Patent: Oct. 13, 2015

(54) PYROLYSIS APPARATUS USING LIQUID METAL

(71) Applicant: KOREA INSTITUTE OF INDUSTRIAL TECHNOLOGY, Chungcheongnam-do (KR)

(72) Inventors: Uen Do Lee, Daejeon (KR); Won Yang, Gyeonggi-do (KR); Dong Ho Park, Gyeonggi-do (KR); Ji Hong Moon, Gwangju (KR); Jeong Woo Lee, Daejeon (KR); Young Doo Kim, Seoul (KR); Chang Won Yang, Incheon (KR); Kwang Soo Kim, Chungcheongnam-do (KR)

(73) Assignee: Korea Institute of Industrial Technology, Chungcheongnam-Do (KR)

( * ) Notice: Subject to any disclaimer, the term of this patent is extended or adjusted under 35 U.S.C. 154(b) by 0 days.

(21) Appl. No.: 14/366,003

(22) PCT Filed: Nov. 9, 2012

(86) PCT No.: PCT/KR2012/009462
§ 371 (c)(1),
(2) Date: Jun. 17, 2014

(87) PCT Pub. No.: WO2013/094878
PCT Pub. Date: Jun. 27, 2013

(65) Prior Publication Data
US 2014/0356256 A1 Dec. 4, 2014

(30) Foreign Application Priority Data

Dec. 21, 2011 (KR) .................. 10-2011-0138963

(51) Int. Cl.
*B01J 8/18* (2006.01)
*B01J 19/26* (2006.01)
(Continued)

(52) U.S. Cl.
CPC . *B01J 6/008* (2013.01); *A62D 3/32* (2013.01); *B01J 8/18* (2013.01); *B01J 19/16* (2013.01);
(Continued)

(58) Field of Classification Search
CPC .............. B01J 8/18; B01J 19/00; B01J 19/26; B01J 19/0006; B01J 2219/00164; B01J 2219/00119; B01J 19/2465; C10G 1/02; C10B 49/14; A62D 3/32
USPC .................. 422/129, 141, 142, 187, 198, 643; 48/92; 588/314
See application file for complete search history.

(56) References Cited

U.S. PATENT DOCUMENTS 2,730,488 A * 1/1956 De Rosset et al. ............ 208/125
3,729,297 A * 4/1973 Yoshida et al. .................. 48/92
(Continued)

FOREIGN PATENT DOCUMENTS

JP 2003035408 2/2003
KR 100136372 B1 1/1998
KR 1020040081958 9/2004

*Primary Examiner* — Jennifer A Leung
*Assistant Examiner* — Huy-Tram Nguyen
(74) *Attorney, Agent, or Firm* — McNees Wallace & Nurick LLC

(57) ABSTRACT

The present invention relates to a pyrolysis device using a liquid metal including: a hollow reactor in which the liquid metal is received; a circulating pump connected to the reactor; a buffer tank disposed on an upper portion of the reactor and receiving the liquid metal from the circulating pump; a nozzle coupled with the buffet tank and jetting the liquid metal within the buffer tank into the reactor; and an air supply source supplying air to the liquid metal within the reactor, wherein char generated from fuel injected into the reactor is combusted by reacting with air introduced into a lower portion" of the reactor through the air supply source, and liquid metal sprays jetted from the nozzle react with gases generated in the reactor to purify the gases.

9 Claims, 3 Drawing Sheets

(51) Int. Cl.
  C10G 1/02    (2006.01)
  B01J 6/00    (2006.01)
  C10J 1/02    (2006.01)
  B01J 19/16   (2006.01)
  A62D 3/32    (2007.01)
  B01J 19/24   (2006.01)
  C10G 1/10    (2006.01)
  F23G 5/027   (2006.01)
  C10B 49/14   (2006.01)
  C10B 53/02   (2006.01)
  C10B 57/18   (2006.01)
  F23G 5/08    (2006.01)

(52) U.S. Cl.
  CPC ............ *B01J 19/2465* (2013.01); *C10B 49/14* (2013.01); *C10B 53/02* (2013.01); *C10B 57/18* (2013.01); *C10G 1/02* (2013.01); *C10G 1/10* (2013.01); *C10J 1/02* (2013.01); *F23G 5/027* (2013.01); *F23G 5/0276* (2013.01); *F23G 5/085* (2013.01); *C10G 2300/1011* (2013.01); *F23G 2201/304* (2013.01); *F23G 2900/50005* (2013.01); *F23G 2900/50801* (2013.01); *Y02E 50/14* (2013.01)

(56) References Cited

U.S. PATENT DOCUMENTS 4,743,341 A * 5/1988 Hladun ............ 202/99
7,875,090 B2   1/2011 Dietenberger et al.

* cited by examiner

PYROLYSIS APPARATUS USING LIQUID METAL

TECHNICAL FIELD

The present invention relates to a pyrolysis device using liquid metal, and more particularly, to a pyrolysis device which may heat liquid metal using decomposition heat generated by directly combusting char, which is a byproduct generated during a decomposition process of fuel supplied to a reactor, within the reactor and heat generated by oxidizing some of the liquid metal and extract gas of a volatile component by pyrolyzing fuel, such as biomass, coal, and waste plastic, using the heated liquid metal.

BACKGROUND ART

With the progress of industrialization, the amount of domestic waste and various kinds of industrial waste has continuously increased. In particular, a considerable amount of disposable products are used and thus the amount of waste thereof has increased day by day.

An example of a method of treating waste according to the related art may include a method of supplying oxygen to an incinerator and incinerating waste at a high temperature of 900 C or more using a direct firing method. However, when waste includes rubber, textiles, and plastic products and is treated by the above-mentioned incineration method, various pollutants such as fumes and bad smell which are mainly responsible for air pollution may be generated in large quantities and the incineration ash may also have residual pollutants which have to be further treated.

Recently, for treating general wastes, a technology of pyrolyzing and treating components other than carbon by heating the waste in anoxic-conditions has been proposed.

Meanwhile, Korean Patent No. 0354920 discloses a pyrolysis apparatus including: a pyrolysis furnace which pyrolyzes waste; a mixing furnace which mixes the pyrolyzed waste with air; a conventional combustion furnace which incinerates the pyrolyzed waste mixed with the air; a conventional dust collector which collects dust from the pyrolyzed waste; a cleaner which cleans the dust collected gases; primary and secondary neutralizers which neutralize harmful gases passing through the cleaner, and a drier which dries the neutralized gases sucked into a blower using a heater.

However, since the method of pyrolyzing and treating residual waste as described in the above Cited Document performs the pyrolysis process in a batch mode, residual solid products have to be removed from the pyrolysis furnace in a non-continuous way, and the furnace has to be repeatedly reconditioned in an anoxic-condition after the sequential process of re-injecting, melting, and pyrolysing of the new feedstock in the pyrolysis furnace.

Further, in the pyrolysis furnace according to the related art as described above, a separate quenching means or a heat insulating means is insufficient, such that heat efficiency may be reduced and a considerable time for heating and cooling may be required. Further, even though the pyrolysis furnace includes a dust collector, the dust collector cannot perfectly remove the pollutants so that the ultimately discharged gas may still include harmful emissions.

On the other hand, various kinds of harmful components including acid gas are included in the product gases which are generated during the pyrolysis process. When pollutants and the like in gases are discharged as they are, along with the product gases, a quality of extracted gases is degraded. Therefore, a gas treating apparatus capable of treating the pollutants is required.

DISCLOSURE

Technical Problem

An aspect of the present invention provides a pyrolysis device capable of obtaining oxidizing heat by reacting air supplied through a lower portion of a reactor with char, which is a non-reacted byproduct, and some liquid metal and pyrolyzing fuel supplied to the reactor without stopping operation of a liquid metal reactor or adding a separate heat supply apparatus.

Another aspect of the present invention provides an apparatus for heating liquid metal using oxidizing heat generated by direct combustion within a reactor and for pyrolyzing fuel such as biomass, coal, and waste plastic using the heated liquid metal.

Still another aspect of the present invention provides an apparatus for removing char, which is a non-reacted byproduct, using a reducing agent of liquid metal oxidized depending on temperature conditions without a separate apparatus.

Still yet another aspect of the present invention provides a pyrolysis device for separating and removing impurities included in a feedstock due to a different specific gravity between the liquid metal and the impurities to facilitate maintenance and management.

Technical Solution

According to one aspect of the present invention, there is provided a pyrolysis device using a liquid metal including: a hollow reactor in which the liquid metal is received; a circulating pump connected to the reactor; a filter disposed to a front end of the circulating pump to remove a residual impurity in the liquid metal; a buffer tank disposed on an upper portion of the reactor and receiving the liquid metal from the circulating pump; a nozzle coupled with the buffer tank and jetting the liquid metal within the buffer tank into the reactor; and an air supply source supplying air to the liquid metal within the reactor, wherein char generated from fuel injected into the reactor and part of the liquid metal are combusted by reacting with air introduced into a lower portion of the reactor through the air supply source, and liquid metal sprays jetted from the nozzle react with gases generated in the reactor to purify the gases.

The pyrolysis device may further include: a ring-shaped bubble generator attached to a lower end of the reactor, in which the bubble generator may radially inject the air from the air supply source onto the liquid metal bed within the reactor.

The air introduced into the lower portion of the reactor is used for an aeration.

The liquid metal may include any one of a group consisting of Sn, Bi, and a mixture of Sn and Bi.

The pyrolysis device may further include: a control unit connected to the circulating pump, the reactor, and a slag outlet connected to the reactor, in which the control unit may control at least one of a pumping speed of the circulating pump, a combustion amount in the reactor, and a discharge amount of the slag from the slag outlet.

The gas generated in the reactor may be exhaust gas including a sulfur compound.

A feedstock introduced into the reactor may be any one or more of a group consisting of biomass, coal, waste plastic, and waste PCB.

The nozzle may be removably coupled with the buffer tank and may be selectively coupled with the buffer tank depending on a size of a jetting hole of the nozzle.

The reactor may further include a blower or an induced draft fan and thus an inside of the reactor may keep a vacuum state.

Advantageous Effects

According to the pyrolysis device in accordance with the embodiments of the present invention, the char generated during the pyrolysis process of the fuel injected into the reactor may not be combusted in the separate apparatus and the char is instead directly combusted using the heated air supplied to the combustion furnace, thereby generating the decomposition heat and the generated oxidizing heat may be transferred to the liquid metal within the reactor, thereby effectively supplying heat to the whole system. Further, the heating is performed by using the reaction heat which is generated by reacting the liquid metal of the reactor with air. In this case, when the aeration state of air supplied within the reactor is kept, the mixing and the heat transfer between the liquid metal of higher specific gravity and the non-reacted char of lower specific gravity may be accelerated.

According to the embodiments of the present invention, the amount of air, the oxidizer, may be controlled to appropriately control the temperature, such that the oxidation and reduction between the char and the liquid metal may be selectively reacted, thereby easily removing the char.

According to the embodiments of the present invention, the heat may be effectively delivered to the injected feedstock and impurities such as tar and dust which are included in the pyrolyzed discharging gas may be removed, thereby obtaining a high quality product gas.

Further, the impurities included in a feedstock may be separated and removed due to the different specific gravity between the liquid metal and the impurities, thereby facilitating the maintenance and management.

Further, according to the embodiments of the present invention, the liquid metal is melted within the operation range to maintain a liquid state, has the high boiling point to prevent a loss due to the evaporation, has a heat capacity larger than that of air and water which are mainly used in the existing heat exchangers to increase the amount of heat transfer and the efficiency of the heat exchange, and has the low viscosity to improve the convenience of the transportation.

MODE FOR INVENTION

The above and other objects, features and advantages of the present invention will be more clearly understood by describing in detail exemplary embodiments of the present invention with reference to the accompanying drawings. The described embodiments are exemplified for description of the present invention and thus are not limited to the technical range of the present invention.

Components forming a pyrolysis device 100 according to an embodiment of the present invention may be integrally formed or separately formed, if necessary. Further, some of the components may be omitted according to use.

Figure 2:
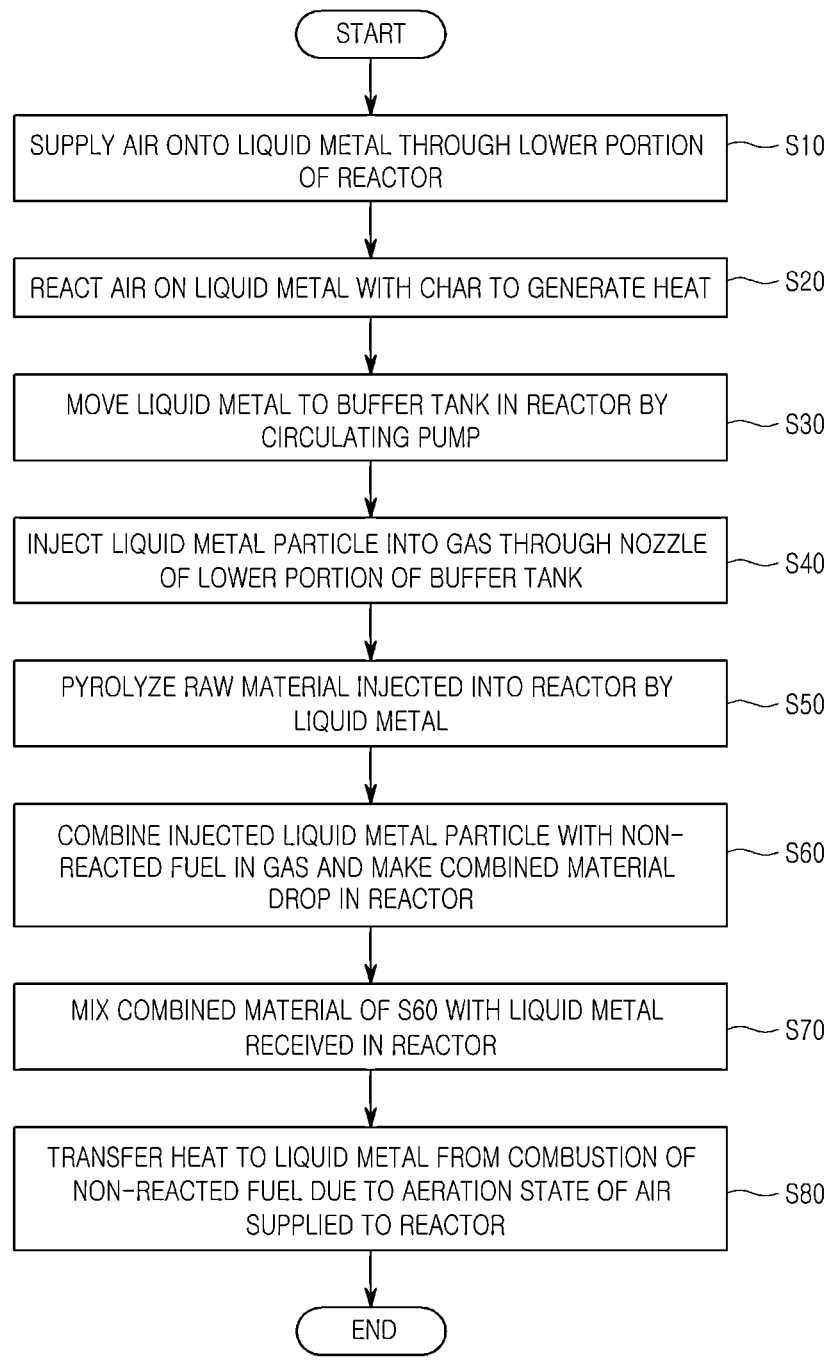
FIG. 2 is a flow chart of a process of operating a pyrolysis device according to an embodiment of the present invention.
Figure 3:
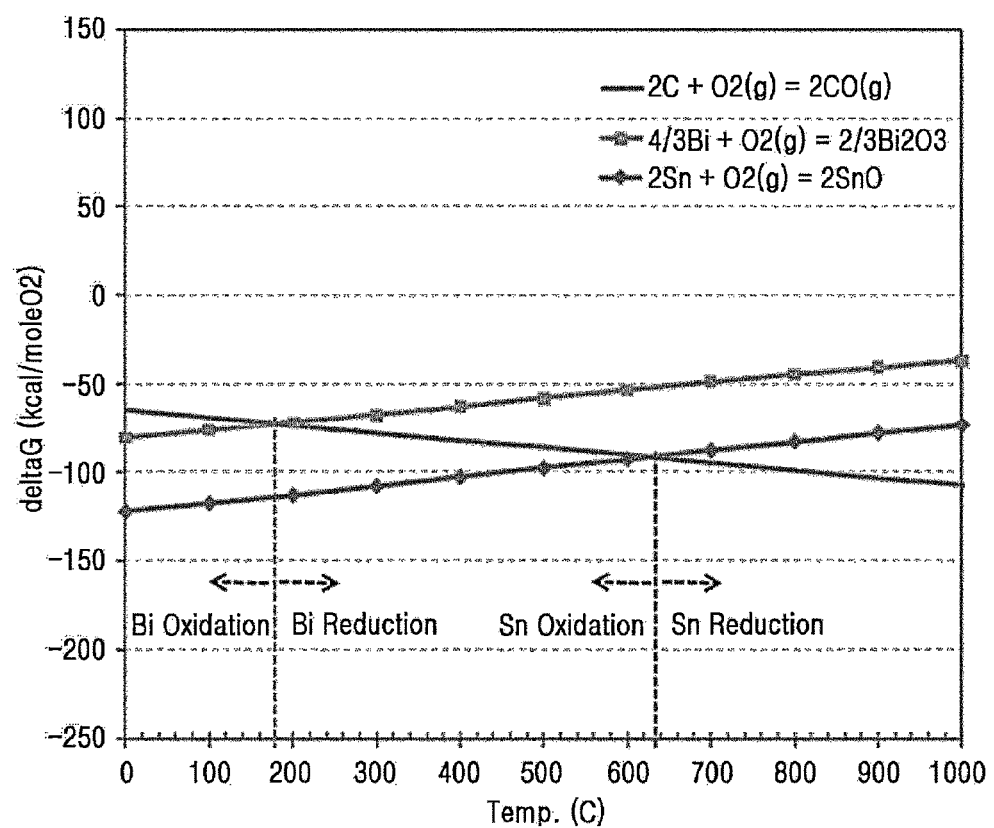
FIG. 3 is a graph of a change in Gibbs free energy of liquid metal and carbon under a temperature condition according to an embodiment of the present invention.

An exemplary embodiment of the pyrolysis device 100 according to the present invention will be described with reference to FIGS. 1 to 3. The thickness of lines, size of components, or the like, illustrated in the drawings may be exaggerated for clearness and convenience of explanation. Further, the following terminologies are defined in consideration of the functions in the present invention and may be construed in different ways by intention or practice of users and operators. Therefore, the definitions of terms used in the present description should be construed based on the contents throughout the specification.

Configuration Description of Pyrolysis Device 100 According to the Invention

Hereinafter, a configuration of the pyrolysis device 100 according to the embodiment of the present invention will be described with reference to FIG. 1.

The pyrolysis device 100 according to the embodiment of the present invention includes a hollow reactor 10 in which a liquid metal 11 is received, a circulating pump 20 connected to a lower portion of the reactor 10 to circulate the liquid metal 11, a filter 47 disposed at a front end of the circulating pump 20 to remove residual impurities of the liquid metal 11, a buffer tank 30 connected to the circulating pump 20 and disposed on an upper surface of the reactor 10, a plurality of nozzles 31 coupled with a lower surface of the buffer tank 30 and having a plurality of jetting holes which jet the liquid metal 11 within the buffer tank 30 into the reactor 10, and an air supply source 410 which supplies air into the liquid metal 11 within the reactor 10.

Figure 1:
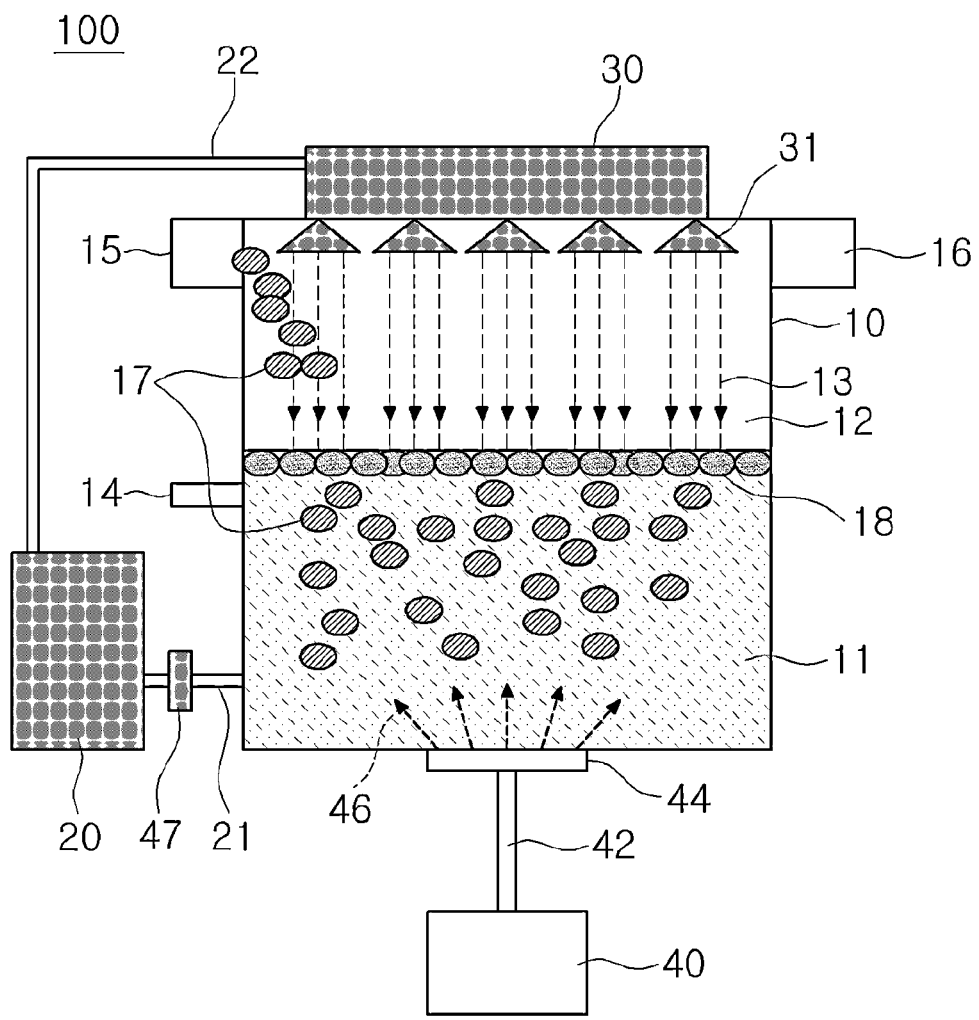
FIG. 1 is a conceptual diagram of a pyrolysis device according to an embodiment of the present invention.

The pyrolysis device 100 using a liquid metal further includes a ring-shaped bubble generator attached to a lower end of the reactor 10, in which the bubble generator 44 radially jets air onto the liquid metal 11 within the reactor 10 from the air supply source 40 (see reference numeral 46 of FIG. 1).

The reactor 10 is a place in which the liquid metal 11 in a molten state and gases 12 to be purified are located. In the reactor 10, the liquid metal 11 is kept in the molten state due to combustion heat which is generated by reacting the air supplied by the bubble generator 44 with char, which is a non-reacted byproduct, and some of the liquid metal and liquid metal sprays 13 are jetted into the reactor 10 through the nozzle 31 to purify and heat the gases 12 generated in the reactor 10.

The liquid metal 11 and the gases 12 within the reactor 10 are separated into top and bottom portions due to a gravity difference. In detail, the liquid metal 11 is located at a lower portion of the reactor 10 and the gases 12 are located at an upper portion of the reactor 10 above the liquid metal.

The reactor 10 includes a plurality of inlets 15 into which a feedstock 17 is injected and an outlet 16 through which the gases 12 are discharged. The feedstock 17 is injected into the reactor 10 through the inlet 15. An example of the feedstock 17 injected into the reactor 10 may include biomass, coal, waste plastic, waste PCB, and the like.

The injected feedstock 17 is pyrolyzed by the liquid metal sprays 13 and the heat from the liquid metal 11 and is separated into the gases 12, char 18 which is a non-reacted char, and other impurities. The gases 12 are made of volatile components and are the object of extraction of the present invention. The char 18 is combusted by reacting with the air from the air supply source 40 and thus provides reaction heat to the liquid metal 11. Other impurities are discharged to a slag output 14, along with slag.

As the result of pyrolyzing the feedstock 17, the gases 12 generated at the upper portion of the reactor 10 may be purified through the liquid metal sprays 13 jetted from the nozzle 31 and may be discharged to the outside. The buffer tank 30 and the nozzle 31 are disposed at the upper end of the reactor 10 and the nozzle 31 jets the liquid metal sprays 13 among the gases 12. Impurities such as H2S, tar, dust, and the like which are included in the gases 12 are melted in the liquid metal sprays 13 jetted into the gases 12. The jetted liquid metal sprays 13 and the impurities drop into the reactor 10 in the coupled state and are mixed with the liquid metal 11 which is located at the lower portion of the reactor 10. That is, the liquid metal sprays 13 are jetted into the gases 12 and the impurities of gas which is coupled and discharged with the H2S, tar, dust, and the like which are included in the gases 12 are reduced.

The reactor 10 may further include the slag outlet 14 through which slag may be discharged to the outside. The feedstock 17 is pyrolyzed in the reactor 10 and thus the slag which is an impurity melted in the liquid metal 11 floats on the surface of the liquid metal 11 due to the specific gravity difference from the liquid metal 11 in the reactor 10. However, the slag has a larger gravity than that of the char 18 and thus may be formed at a lower layer of the char, such that the slag may be selectively discharged to the outside.

The reactor 10 may further include a blower or an induced draft fan, (not illustrated). Only the liquid metal 11, the feedstock 17, and products are present within the reactor 10, and therefore the reactor 10 may be kept in a vacuum state by controlling the blower. In this case, the reactor 10 in the vacuum state may assist with rapid pyrolysis and increase the output of the gases 12 which are volatile components.

The circulating pump 20 is connected to the reactor 10 and the buffer tank 30 to circulate the liquid metal 11 in the pyrolysis device 100. The circulating pump 20 may be connected to the lower portion of the reactor 10 to circulate the liquid metal 11 in which a small amount of slag is included. That is, the slag having a small specific gravity floats within the reactor 10 and thus the amount of impurities is relatively small in the lower layer of the liquid metal 11.

Further, the circulating pump 20 may further include the filter 47 from which the impurities are removed. Even though the slag outlet 14 removes the impurity from the liquid metal 11, since the impurities which are not separated may be melted in the liquid metal 11, the filter may be added to the pump to remove the impurity.

The buffer tank 30 is connected to the circulating pump 20 to jet the liquid metal 11 transported from the circulating pump 20 among the gases 12 which are disposed on the upper portion of the reactor 10 through the nozzle 31. The nozzle 31 is detached from the buffer tank 30. Therefore, the nozzle 31 may be selectively coupled with the buffer tank 30 depending on the jetting holes of the nozzle 31.

Further, the buffer tank 30 may store some of the liquid metal 11 to be jetted and even though the circulating amount of the liquid metal 11 is instantly changed depending on an operation of the circulating pump 20 and the filter, the amount jetted from the nozzle 31 to the liquid metal 11 may be constantly kept.

As described above, the nozzle 31 is coupled with the lower surface of the buffer tank 30 and thus jets the liquid metal 11 moving from the buffer tank 30 into the reactor 10. A plurality of nozzles 31 may be disposed at the lower end of the buffer tank 30 in a line and the jetting holes formed in the nozzle 31 are formed radially and the liquid metal sprays 13 may be minutely jetted among the gases 12 which are located at the upper portion of the reactor 10.

Since the gases 12 pass through the jetted liquid metal sprays 13 and thus are discharged by the pyrolysis process, dust and sulfurization-based gas components are removed, such that a high quality product gas can be obtained.

As such, the pyrolysis device 100 according to the embodiment of the present invention generates reaction heat by directly combusting the char 18 using heated air supplied to a combustion furnace 10 without performing the combustion the char 18 generated during the pyrolysis process of fuel injected into the reactor 10 using a separate apparatus. Further, the reaction heat is generated by directly combusting part of the liquid metal 11 and thus the generated decomposition heat is delivered to the liquid metal 11 within the reactor 10, thereby effectively supplying heat. In this case, when aeration is maintained within the reactor, the mixing and the heat transfer between the liquid metal 11 having higher specific gravity and the char which is the non-reacted fuel may be accelerated. Herein, the aeration state may be defined as the process of supplying the air so that the air within the liquid metal reaches a saturation state.

Further, the pyrolysis device 100 may further include a control unit (not illustrated). The control unit controls a pumping speed of the circulating pump 20 to be able to control a circulating speed and a circulating amount of the liquid metal 11 in the pyrolysis device 100 and controls the air supply source 40 to be able to control an increase in temperature of the liquid metal 11 within the reactor 10, such that an oxidation and reduction reaction conditions, extent of melting, and a viscosity of the liquid metal 11 may be controlled. Further, the control unit controls the slag outlet 14 to be able to control an amount of slag which is discharged from the reactor 10.

According to the embodiment of the present invention, the liquid metal 11 has a heat capacity larger at the same phase than that of air and water which are mainly used in the exiting heat exchange and thus has a high amount of heat transfer when an appropriate process design is involved, such that the liquid metal 11 is effective in the heat exchange, and the target liquid metal 11 has a lower viscosity than that of another liquid metal 11 and thus is convenient in the movement, such that the liquid metal is appropriate for the process.

Further, according to the embodiment of the present invention, the liquid metal 11 circulating heat has a large specific gravity difference from various impurities (ash, unburned fuel, moisture) which may occur when the liquid metal 11 directly contacts the gases 12 and therefore is effective in separation due to the filter and the gravity difference.

Further, according to the embodiment of the present invention, the liquid metal 11 circulating heat may be formed by melting any one of tin (Sn), bismuth (Bi), or a mixture of the tin (Sn) and the bismuth (Bi). The liquid metal 11 made of tin (Sn), bismuth (Bi), or a mixture of the tin (Sn) and the bismuth (Bi) is melted depending on the operation of the pyrolysis device 100) according to the embodiment of the present invention to keep a liquid state and has a high boiling point to have no loss due to evaporation during the operation of the pyrolysis device 100 according to the embodiment of the present invention. Further, the present liquid metal 11 may be oxidized or reduced depending on the temperature conditions as illustrated in FIG. 3 and the oxidized metal can be reused by the reduction process with the non-reacted char with appropriate conditions as shown in FIG. 3.

Further, the liquid metal 11 made of the above-mentioned metal has a heat capacity larger than that of gas and steam which are used in the existing pyrolysis, to accordingly be able to supply energy having higher calories with a relatively smaller amount than the feedstock 17 and the corresponding liquid metal 11 has a higher specific gravity but a lower viscosity than that of the feedstock 17 and thus is effectively infiltrated into the supplied feedstock 17, to thereby be able to perform the pyrolysis better.

Operation Method of Pyrolysis Device 100 According to the Invention

Hereinafter, a process of pyrolyzing the feedstock and reusing the char 18 depending on the pyrolysis device 100 according to the embodiment of the present invention will be described with reference to FIGS. 1 to 3.

First, the heated air supplied from the air supply source 40 is supplied into the liquid metal 11 of the reactor 10 (S10). The air passing through an air intake tube 42 from the air supply source 40 is jetted onto the liquid metal 11 through the bubble generator 44 which is attached to the lower end of the reactor 10 at high speed.

After step S10, the heated air dispersed in the liquid metal 11 directly reacts with the liquid metal 11 and the mixed char 18 to be able to combust char 18 and part of the liquid metal 11 (S20). In addition, the liquid metal 11 is heated by the reaction heat and being kept as a molten state at a constant temperature and keeps a viscosity which allows it to easily move through the circulating pump 20.

After step S20, the liquid metal 11 moves from the reactor 10 to the buffer tank 30 by the circulating pump 20 (S30). The melted liquid metal 11 is directly connected to the reactor 10 or moves to the circulating pump 20 which is connected through the intake pipe 21, and the like. The filter 47 is disposed at the front end of the circulating pump 20 to be able to remove the impurities included in the liquid metal 11. The circulating pump 20 moves the liquid metal 11 to the buffer tank 30 through the discharge tube 22, and the like.

After step S30, the nozzle 31 which is disposed at the lower portion of the buffer tank 30 jets the liquid metal 11 into the reactor (S40). The buffer tank 30 temporarily receives the liquid metal 11 moving from the circulating pump 20 to be able to keep the amount of liquid metal 11 which is constantly jetted among the gases 12 through the nozzle 31. The liquid metal 11 moving to the buffer tank 30 starts to be jetted into the reactor 10 through the nozzle 31 in a form of the liquid metal sprays 13.

After step S40, the feedstock 17 injected into the inlet 15 reacts with the high-temperature liquid metal sprays 13 and is thus pyrolyzed (S50). The feedstock 17 includes a material to be pyrolyzed and fuel. The pyrolyzed feedstock 17 is separated into the gases 12, the char 18, and other impurities.

The slag which is other impurities generated according to the result obtained by pyrolyzing the feedstock 17 injected into the reactor 10 by the liquid metal 11 rises to the surface of the liquid metal 11 due to the gravity difference and is separated from the char 18 and the liquid metal 11 and the separated slag is discharged to the outside through the slag outlet 14.

After step S50, the jetted liquid metal sprays 13 are coupled with impurities in the gases 12 and thus drop in the reactor 10 (S60). The gases 12 from which the impurities such as char and dust are removed are discharged to the outlet 16 through the upper portion of the reactor 10, the liquid metal sprays 13 jetted into the reactor 10 penetrates among the discharged gases 12, and the impurities included in the gases are physic-chemically removed to purify the gases 12.

After step S60, the liquid metal sprays 13 which are coupled with the impurities and the char 18 are mixed with the liquid metal 11 received in the reactor 10 (S70). The jetted liquid metal sprays 13 move to the lower portion of the reactor 10. The liquid metal from the sprays 13 move to the lower portion of the reactor 10 and thus are mixed with the liquid metal 11 which is located at the lower portion of the reactor 10 in the molten state and the mixed liquid metal 11 keeps the molten state by the combustion furnace 10.

After step S70, the oxidation and reduction of the char 18 and the liquid metal 11 are repeated by controlling the aeration state of air supplied to the reactor 10. Herein, the step S70 may be defined by a step of reheating and reusing the liquid metal 11 of the reactor 10.

The operation process of the pyrolysis device 100 as described above may be controlled by the control unit (not illustrated). The control unit controls the pumping speed of the circulating pump 20, the melting temperature of the liquid metal 11, the amount of slag discharged from the slag outlet 14, and the like to control the overall operation of the pyrolysis device 100 according to the embodiment of the present invention.

According to the embodiment of the present invention, the operation of the pyrolysis device 100 which is formed of steps S10 to S80 as described above is repeatedly performed, and thus the liquid metal 11 is jetted to the gases 12 using the nozzle 31, such that the heat exchange may be easier and the duration may be longer than those of the existing pyrolysis device 100, thereby increasing the yield of the pyrolyzed gases 12.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Accordingly, such modifications, additions and substitutions should also be understood to fall within the scope of the present invention.

The exemplary embodiments of the present invention are described above, but it should be understood that the present invention is not limited to a specific embodiment. Those skilled in the art will appreciate that various changes and modifications are possible, without departing from the scope and spirit of the invention as disclosed in the accompanying claims. Accordingly, such changes, modifications, equivalents should also be understood to fall within the scope of the present invention.

The invention claimed is:

1. A pyrolysis device using, a liquid metal, comprising:
   a hollow reactor in which the liquid metal is received;
   a circulating pump connected to the reactor;
   a buffer tank disposed on an upper portion of the reactor and receiving the liquid metal from the circulating pump;
   a nozzle coupled with the buffer tank and jetting the liquid metal within the buffer tank into the reactor; and
   an air supply source supplying air to the liquid metal within the reactor,
   wherein char generated from fuel injected into the reactor and the liquid metal are combusted by reacting with air introduced into a lower portion of the reactor through the air supply source,
   liquid metal sprays jetted from the nozzle react with gases generated in the reactor to purify the gases, and
   air supplied to the reactor is controlled to repeatedly perform an oxidation and reduction reaction with the liquid metal and the liquid metal is thus reused.

2. The pyrolysis device of claim 1, further comprising:
   a ring-shaped bubble generator attached to a lower end of the reactor, wherein the bubble generator radially jets the air from the air supply source onto the liquid metal within the reactor.

3. The pyrolysis device of claim 1, wherein the air introduced into the lower portion of the reactor is used for aeration.

4. The pyrolysis device of claim 1, wherein the liquid metal comprises any one of a group consisting of Sn, Bi, and a mixture of the Sn and the Bi.

5. The pyrolysis device of claim 1, further comprising:
a control unit connected to the circulating pump, the reactor, and a slag outlet connected to the reactor, wherein the control unit controls at least one of a pumping speed of the circulating pump, a combustion amount in the reactor, and a discharge amount of the slag from the slag outlet.

6. The pyrolysis device of claim 1, wherein the gas generated in the reactor is exhaust gas including a sulfur compound.

7. The pyrolysis device of claim 1, wherein a feedstock introduced into the reactor is any one or more of a group consisting of biomass, coal, waste plastic, and waste PCB.

8. The pyrolysis device of claim 1, wherein the nozzle is removably coupled with the buffer tank and is selectively coupled with the buffer tank depending on the size of a jetting hole of the nozzle.

9. The pyrolysis device of claim 1, wherein the reactor further includes a blower and thus an inside of the reactor can be kept as a vacuum state.

* * * * *